(12) United States Patent
Leu

(10) Patent No.: US 8,473,223 B2
(45) Date of Patent: Jun. 25, 2013

(54) METHOD FOR UTILIZING FABRICATION DEFECT OF AN ARTICLE

(76) Inventor: Iyun Leu, Hsinchu (TW)

(*) Notice: Subject to any disclaimer, the term of this patent is extended or adjusted under 35 U.S.C. 154(b) by 617 days.

(21) Appl. No.: 12/575,287

(22) Filed: Oct. 7, 2009

(65) Prior Publication Data
US 2011/0082650 A1  Apr. 7, 2011

(51) Int. Cl.
  *G06F 19/00*  (2006.01)
  *G06F 17/50*  (2006.01)
  *G06K 9/00*  (2006.01)
(52) U.S. Cl.
  USPC .............................. 702/35; 716/112; 382/149
(58) Field of Classification Search
  USPC ................. 702/35, 36, 40, 81, 84–85, 94–95, 702/97, 127, 150, 155–158, 182–183, 189; 382/141, 144–145, 147, 149, 151, 181, 190, 382/195, 209, 216; 438/14, 16; 700/95, 97, 700/108–110, 121; 714/25, 37; 716/100, 716/106–107, 110–112, 132, 135–136
  See application file for complete search history.

(56) References Cited

U.S. PATENT DOCUMENTS
2009/0138835 A1* 5/2009 Sinha et al. .................... 716/4

OTHER PUBLICATIONS

Sischka et al., Detection of Defects on the Surface of Microelectronic Structures, Jan. 1989, IEEE Transaction on Electron Devices, vol. 36, No. 1, pp. 8-13.*

* cited by examiner

*Primary Examiner* — Toan Le
(74) *Attorney, Agent, or Firm* — Houtteman Law LLC

(57) ABSTRACT

A method for utilizing fabrication defect of an article includes steps of obtaining a defect image from a fabrication process for fabricating the article, wherein the defect image includes a defect and fabricated circuit patterns around the defect; obtaining coordinates of the defect; retrieving a layout of the article including design circuit patterns; extracting a contour of the defect from the defect image; superposing the contour of the defect on the layout according to the coordinates of the defect; and determining whether the defect causes a open failure or a short failure on the layout by analyzing overlaps between the contour of the defect and the design circuit patterns. Therefore, the article's health can be monitored during the fabrication process, not until the end of the fabrication process.

18 Claims, 9 Drawing Sheets

METHOD FOR UTILIZING FABRICATION DEFECT OF AN ARTICLE

BACKGROUND OF THE INVENTION

1. Field of the Invention

The present invention relates to a method for utilizing fabrication defect of an article.

2. Description of Related Art

The fabrication process for integrated circuit dies includes film deposition, masking, photo lithography, etching, etc. During the fabrication process, the defects generated everyday in each process step and equipment are affecting the product yield. The product yield would have a direct relationship to the die cost.

However, the IC design houses have no direct knowledge or don't know how to control their own product's yield during fabricating stage. So the low yield failures will not be noticed until the design houses receive the wafer from foundry fab and finish wafer sort and package test. The design house may suffer customer delivery and quality issue if the wafer or package yield is lower than the requirement. It costs several months to make up the quantities to customer. The engineering resources in debugging low yield problem are also needed to dig out.

Some foundry fabs have considered the influence of defect to product yield. The foundry fabs used the defect area, which is generated from a defect scan and inspection tool, to determine whether the defect causes a killing failure and reduces the product yield. But the defect area represents a defect by a rectangular shape, which is usually larger than actual defect shape. This results in a wrong determination.

Therefore, there is a need for the design house or the foundry fab to accurately determine whether defects, generated during fabricating stage, cause failure or not, so as to further estimate product yield.

Consequently, because of the above limitation resulting from the technical design of prior art, the inventor strives via real world experience and academic research to develop the present invention, which can effectively improve the limitations described above.

SUMMARY OF THE INVENTION

In view of the aforementioned issues, the present invention provides a method for utilizing fabrication defect of an article, which is capable of accurately determining whether any defect causes a failure on the article during the fabrication process. So yield of the article can be predicted.

To achieve the above-mentioned objectives, the present invention provides a method for utilizing fabrication defect of an article, comprising steps of: obtaining a defect image from a fabrication process for fabricating the article, wherein the defect image has a defect and fabricated circuit patterns around the defect; obtaining coordinates of the defect; retrieving a layout of the article comprising design circuit patterns; extracting a contour of the defect from the defect image; superposing the contour of the defect on the layout according to the coordinates of the defect; and determining whether the defect causes a open failure or a short failure on the layout by analyzing overlaps between the contour of the defect and the design circuit patterns.

The present invention provides another method for utilizing fabrication defect of an article, comprising steps of: obtaining a defect image from a fabrication process for fabricating the article, wherein the defect image has a defect and fabricated circuit patterns around the defect; obtaining coordinates of the defect; retrieving a layout of the article comprising design circuit patterns; extracting a local layout from the layout around the coordinates of the defect; extracting a contour of the defect from the defect image; superposing the contour of the defect on the local layout; and determining whether the defect causes a open failure or a short failure on the layout by analyzing overlaps between the contour of the defect and the design circuit patterns.

The present invention provides the following benefits:

1. Design house of the layout can monitor the article' defect situation during the fabrication process, instead of after the end of fabrication process. So, if the defect causes the failure and reduce the yield of the article (product), the design house can know at real time stage.

2. The actual contour of the defect is extracted from the defect image, so the determination of failure for the defect is more accurate. Accordingly, the yield prediction of the article influenced by the defect is more accurate either.

3. The method is automatically triggered when any new defect image is generated. So the defect is analyzed in approximate real-time, which ensures no potential failure of the article will be ignored.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

This invention discloses a method for utilizing fabrication defect of an article, which is capable of accurately determining whether any defect causes a failure on the article during fabrication process. If there is any failure happens to the article and affects the yield of the article, the users (engineer or designer) can know earlier and manage it.

The article can be a wafer, a mask, a PC board, a flat panel display, or solar cell.

The method of the invention can be performed by software, or in combination with software and hardware; and by a single computer, or with multiple computers that interact with one another.

Figure 1:
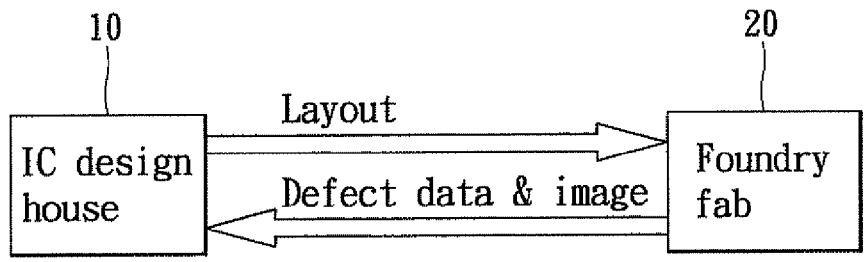
FIG. 1 is a schematic view showing a IC design interacting with a foundry fab according to the present invention.

Please refer to FIG. 1, a first preferable embodiment of the method is set forth as following. The first embodiment takes the wafer as the example of the article.

In Overall, the method is mainly performed in an IC design house 10 (hereinafter referred as to design house 10). The design house 10 provides a layout of its IC design to a foundry fab 20 (hereinafter referred as to fab 20), the layout comprising different design circuit patterns, such as capacitor, transistor, resistor, etc. The fab 20 uses hundreds of fabrication tools and equipments to fabricate many duplicated dies according to the layout on a wafer (article). During the fabrication process, defects will be inevitably generated on the wafer. The defect may be a random particle defect, or a systematic defect, or a process related defect.

The defects are automatically detected by a defect scan and inspection tool at the fab 20, then the defect scan and inspection tool produces defect image and defect data for each of the defects. The defect data includes product name, defect process stage, defect size, defect coordinates, lot number, and wafer number, etc. The defect images and defect data are then sent to the design house 10. Then, the design house 10 uses the layout, the defect images, and the defect data to achieve a failure determination and a yield prediction.

Figure 2:
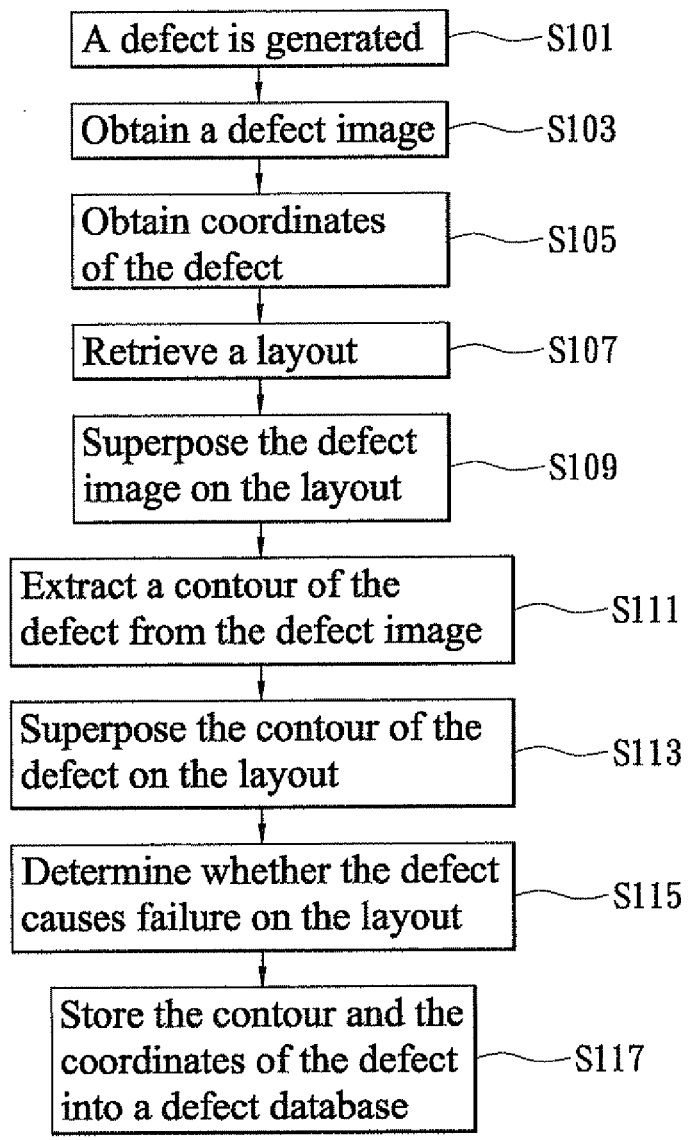
FIG. 2 is a flowchart showing a first preferable embodiment of the method for utilizing fabrication defect of an article according to the present invention.

Please refer to FIG. 2, the detailed workflow of the first embodiment of the method is set forth as following.

The workflow is automatically triggered (started) when any defect is generated on the die during the fabrication process. Please refer to FIG. 3, a defect 101 is generated (step S101), then the defect scan and inspection tool produces a defect image 100, which shows the defect 101 and some fabricated circuit patterns 102 around the defect 101 (step S103). The defect image 100 is sent to design house 10 by internet means, such as web, ftp, etc.

After obtaining the defect image 100, defect data about the defect 101 is also sent to the design house 10 from the fab 20 by internet means, so as to obtain coordinates of the defect 101 (step S105). As mentioning above, the coordinates of the defect 101 is measured by the defect scan and inspection tool. The reference origin of the coordinates is at the center of the wafer. Other defect scan and inspection tool may use the corner of the wafer as the reference origin.

Figure 4:
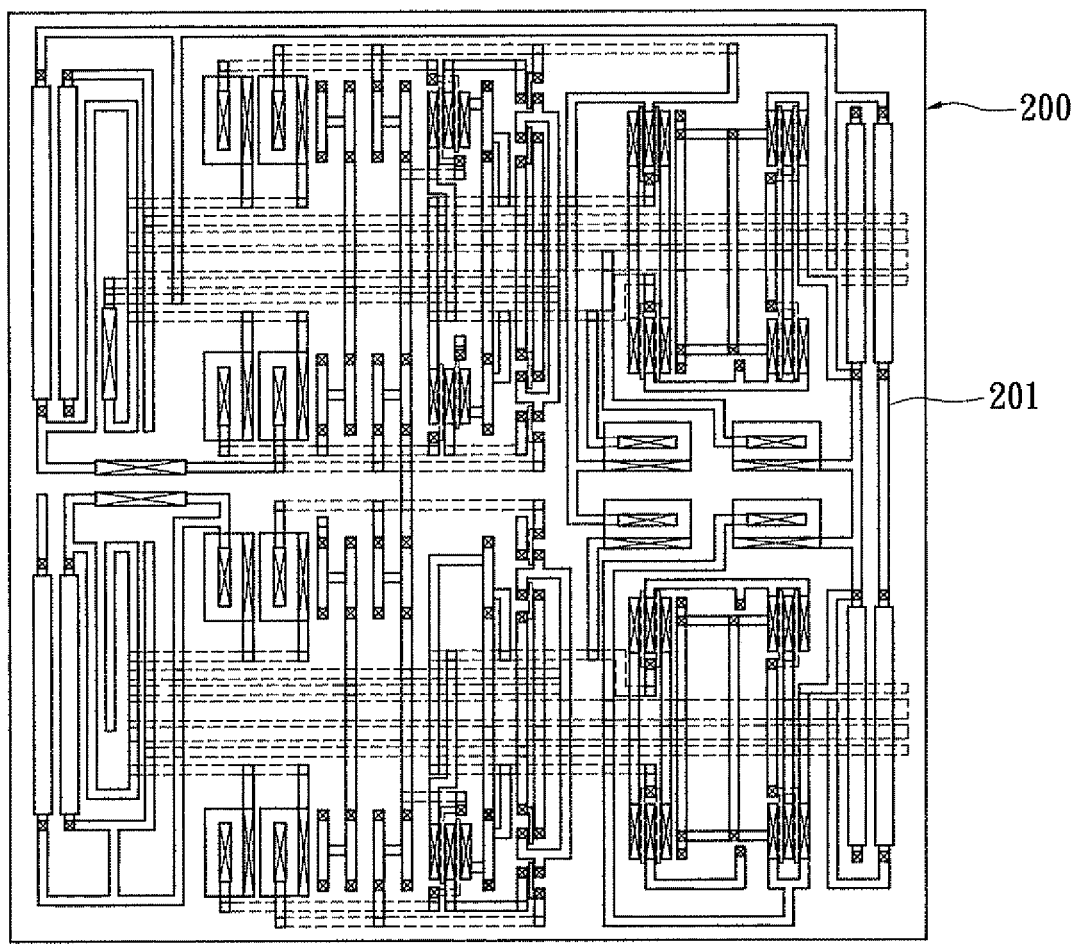
FIG. 4 is a schematic view showing a layout according to the present invention.

Please refer to FIG. 4, next, a layout 200 corresponding to the wafer being fabricated is retrieved from a layout database of the design house 10 (step S107). The layout 200 has some design circuit patterns 201. The layout 200 is stored in the layout database in a GDS II (GDS) standard format.

Figure 5:
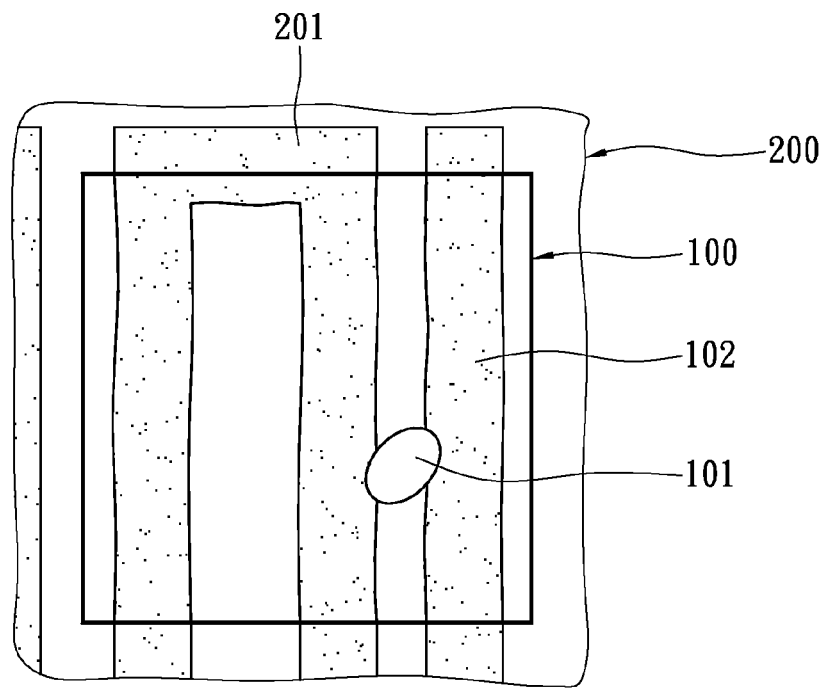
FIG. 5 is a schematic view showing the defect image superposing on the layout according to the present invention.

Then, the defect image 100 is superposed on the layout 200 according to the coordinates of the defect 101 (step S109), which is shown in FIG. 5. The design circuit patterns 201 are overlaid with the fabricated circuit patterns 102. In some cases, the file format of the defect image 100 is not consistent with the file format of the layout 200. For instance, the file format of the defect image 100 is PEG; the file format of the layout 200 is GDS. Therefore, the defect image 100 and layout 200 need to be converted into either GDS contour format or polygon/image contour format first. Then the defect image 100 is able to be superposed on the layout 200.

Next step, a contour of the defect 101 is extracted from the defect image 100, and stored into another image (a step S111). The extraction of the contour of defect 101 is achieved by either cutting the contour of defect 101 from the defect image 100 by some image processing techniques, or analyzing overlaps and differences between the fabricated circuit patterns 102 and the design circuit patterns 201. The actual contour of defect 101 is restored from the defect image 100, then by using the actual contour of defect 101, the failure and yield prediction can be more accurate than that by using approximate rectangular area of the defect.

Figure 6:
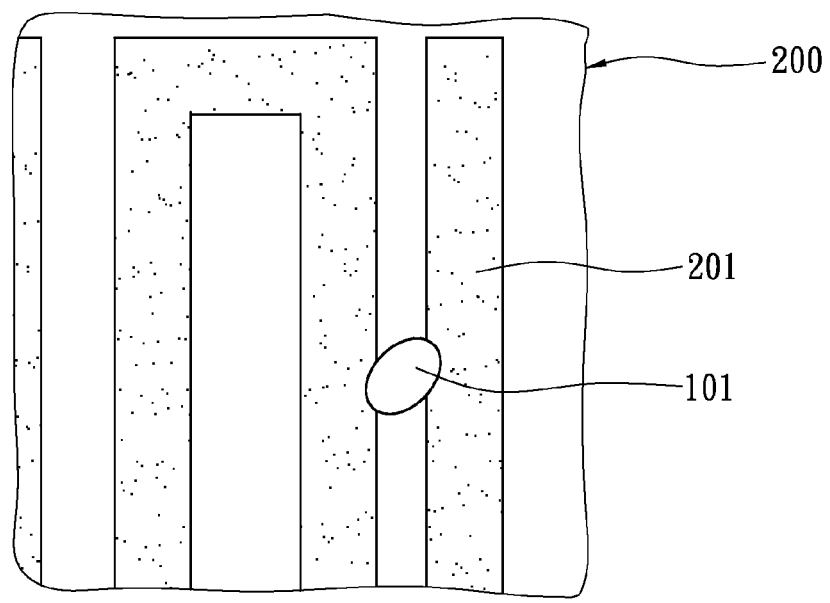
FIG. 6 is a schematic view showing the contour of the defect superposing on the layout according to the present invention.

Please refer to FIG. 6, next, the contour of the defect 101 is superposed on the layout 200 in place, which according to the coordinates of the defect 101 (step S113).

Figure 7:
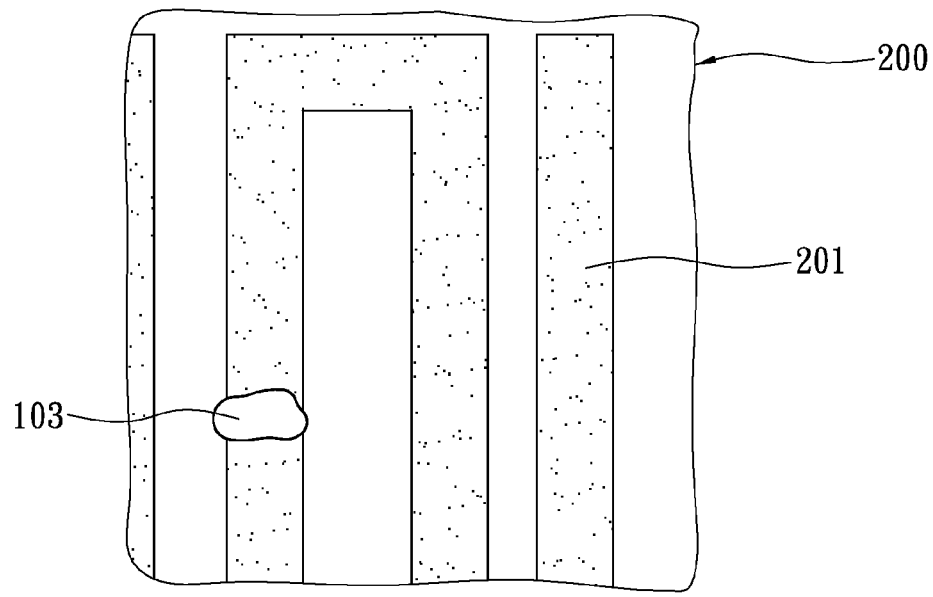
FIG. 7 is a schematic view showing the contour of the other defect superposing on the layout according to the present invention.
Figure 8:
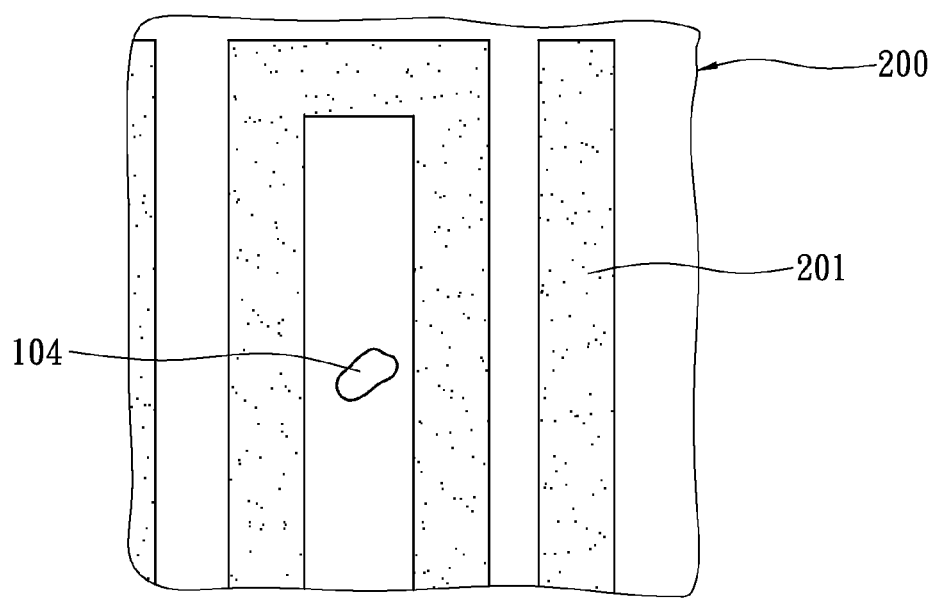
FIG. 8 is a schematic view showing the contour of the other defect superposing on the layout according to the present invention.

Then, overlaps between the contour of the defect 101 and the design circuit patterns 201 is analyzed, so as to determine whether the defect 101 causes an open failure or a short failure on the layout 200 (step S115). The contour of the defect 101 bridges two of the design circuit patterns 201, so the defect 101 causes the short failure to the layout 200. Please refer to FIG. 7, in other situation, the contour of a new defect 103 intercepts one of the design circuit patterns 201, so the defect 103 causes the open failure to the layout 200. Please refer to FIG. 8, a new defect 104 causes no failure to the layout 200, because the contour of the defect 104 doesn't touch any design circuit pattern 201.

The open or short failure usually causes one die of the wafer failure, or malfunctioned; thus the yield of the wafer is reduced. Via the method, the design house 10 can earlier know the issue, not until the day that design house 10 receives and tests the wafer from the fab 20. If the yield reduction issue is severe, then an alarm will send to and notice the design house 10 and the fab 20. Both the design house 10 and the fab 20 can solve the issue earlier, so that the design house 10 may not suffer customer delivery and quality issue.

Furthermore, in some cases, the coordinates of the defect 101 measured by the defect scan and inspection tool is not accurate, so it needs to be corrected, otherwise the determination of failure would be wrong. The correction of the coordinates can be achieved by matching the fabricated circuit patterns 101 of the defect image 100 and the design circuit patterns 201 of the layout 200, so the correction is performed after obtaining the layout 200, i.e. the step S107. The detailed algorithm for correcting the coordinates can refer to a related patent application, which application Ser. No. 12/318,974, of the same inventor to this invention.

Moreover, after the determination of failure, i.e. the step S115, the defect 101 (103, or 104) can be further determined as a random particle defect which has an irregular shape, a systematic defect, or a process related defect; and determined which types (random particle, systematic—necking, bridging; missing, collapsing; process related defect—residue, scratch, corrosion, pitting, haze, water mark, peeling, photo resist lifting, bubble and etc.) the defect 101 (103, or 104) is. The contour, type, and the coordinates of the defect 101 (103, or 104) is stored into a defect database for advanced utilization (step S117).

One of the advanced utilization is to comprehensively analyze all the defects generated during the fabrication process, so as to know the defect root cause, etc. Other one of the advanced utilization is to combine the defect database with Design for Manufacturing (DFM), or Design of Experiment (DOE), so as to find some rules to modify the layout, or design a new layout, for reducing the failure and increasing the yield.

Another advanced utilization is to combine Design of Experiment (DOE), or process split (ex. Defocus Exposure Matrix, etc) with fab module or integration process. This automatic and powerful defect yield diagnosis will identify the random particle, systematic defect, or process related defect, and provide the correlation of module or integration process parameters with defect type, defect yield, defect composition, and defect distribution. Hence, origin and root cause of defect is fully characterized with module or integration process parameters. Best module or integration process condition can be well selected to minimize impact defect yield.

Figure 9:
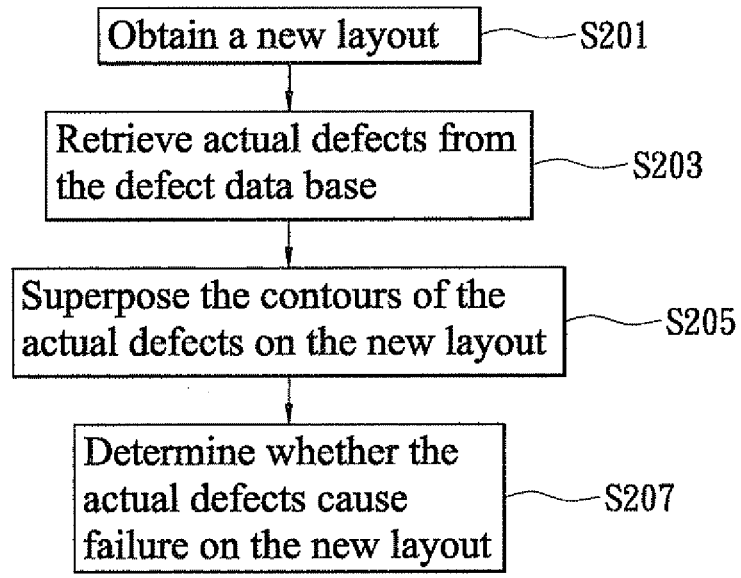
FIG. 9 is another flowchart showing the first preferable embodiment of the method for utilizing fabrication defect of an article according to the present invention.

One more the advanced utilization is to predict a new layout's yield based on the database which stores many actual defects (random particle defects and systematic defects) of the past and recent fabricated wafer. This yield prediction is totally different from the conventional one, which uses simulated, virtual defects. The yield prediction for a new layout is divided into two aspects: one is yield prediction for the actual random particle defects, and the other is yield prediction for the actual systematic defects. Please refer to FIG. 9, the detailed workflow of the yield prediction for the actual random particle defects is set forth as following.

First, a new layout is obtained from the layout database (step S201). The new layout comprises design circuit patterns too, and duplicated dies will be fabricated according to the new layout on a new wafer.

Next, the actual random particle defects (such as defects 101, 103 or 104) of the past and recent fabricated wafer are retrieved from the defect database (step S203). The new wafer and the fabricated wafer have similar fabrication process, i.e. fabricated by the same tools, or equipments.

Then, the contours of the actual random particle defects are superposed on the new layout randomly, artificially, or according to the original coordinates of the actual defects (step S205).

Further, similar to step S115, overlaps between the contour of the actual defects and the design circuit patterns of the new layout is analyzed, so as to determine whether each of the actual defects cause an open failure or a short failure on the new layout (step S207). If the open or short failure is caused on one die of the new wafer, the yield of the new wafer will be reduced. So calculating how many dies have the open or short failure caused by the actual random particle defects can predict the yield of the new wafer.

Because it uses the actual random particle defects data, which come from the similar fabrication process of the fabricated wafer, the yield prediction is more accurate than conventions.

Moreover, if the yield of the new wafer is lower than requirement, the designer of the design house can modify the new layout, or the engineer of the fab can modify the fabrication process for the new layout to increase the yield.

Furthermore, the step S205 can be performed in another way. First, local layouts around the actual defects are respectively extracted from the new layout. Then, the contours of the defects are respectively superposing on the local layouts. In this way, the determination of overlays between the contour of the actual defect and the design circuit patterns can be performed faster, because the local layouts each have much smaller area than the new layout.

Figure 10:
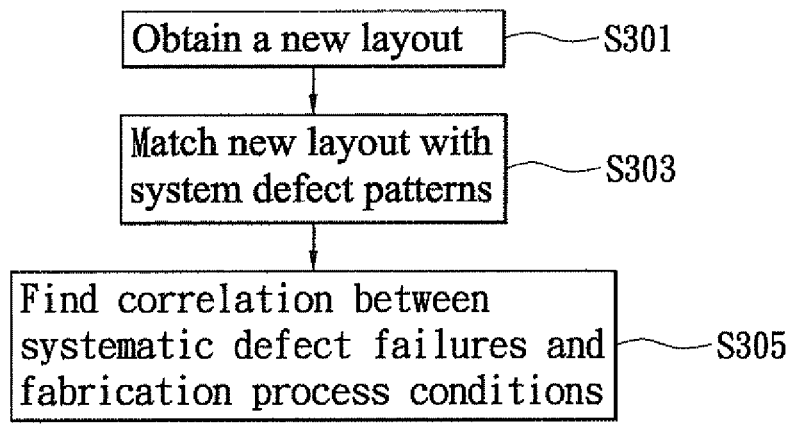
FIG. 10 is a further flowchart showing the first preferable embodiment of the method for utilizing fabrication defect of an article according to the present invention.

Please refer to FIG. 10, the detailed workflow of the yield prediction for the actual systematic defects is set forth as following.

First, a new layout is obtained from the layout database (S301). Then, design circuits of the new layout are matched with systematic defect patterns of a systematic defect patterns library, which is stored in the defect database and established by the actual systematic defects (S303). If the new layout has design circuits that match the systematic defect patterns, a wafer fabricated by the new layout may have systematic defects. The systematic defects possibly generate failures on the wafer, which depends upon the fabrication process conditions, ex. critical dimensions of process parameters. When the systematic defects generate the failures, the yield of wafer will be reduced.

Therefore, next step is to find the correlation between the systematic defect failures and the fabrication process conditions, (S305). Then, which condition the systematic defects will generate failures can be figured out. The correlation is found by analyzing process parameters, in-line data of the fabrication process, or etc. The correlation is also found by DOE analysis, or data mining technique. After the correlation is found, the design house 10 knows which conditions is best for its new layout, that is, yield is less influenced by the systematic defect failures. Then the design house 10 can inform the best conditions to the fab 20 using the conditions to fabricate the wafer of the new layout.

Please refer to FIG. 1 again, as mentioned earlier, the first embodiment of the method is mainly performed at the design house 10; however, it can be also mainly performed at the fab 20. The fab 20 has the defect images and the defect data on its own, it only needs to retrieve the layout from the design house. Then the fab 20 performs the determination of failure, i.e. the step S115, and sends the information of failure or yield to the design house 10, notices the wafer' health to the design house 10.

Apart from the first embodiment, the method has a second preferable embodiment. The second embodiment also takes the wafer as the example of the article, and is mainly performed in the design house 10, or the fab 20.

Figure 3:
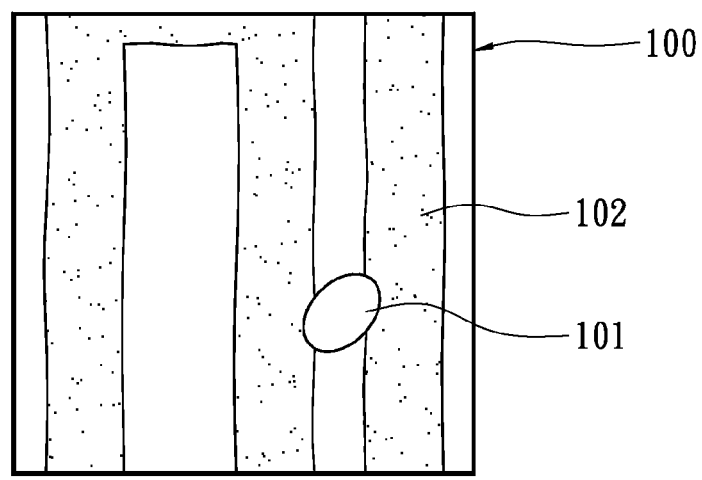
FIG. 3 is a schematic view showing a defect image according to the present invention.
Figure 11:
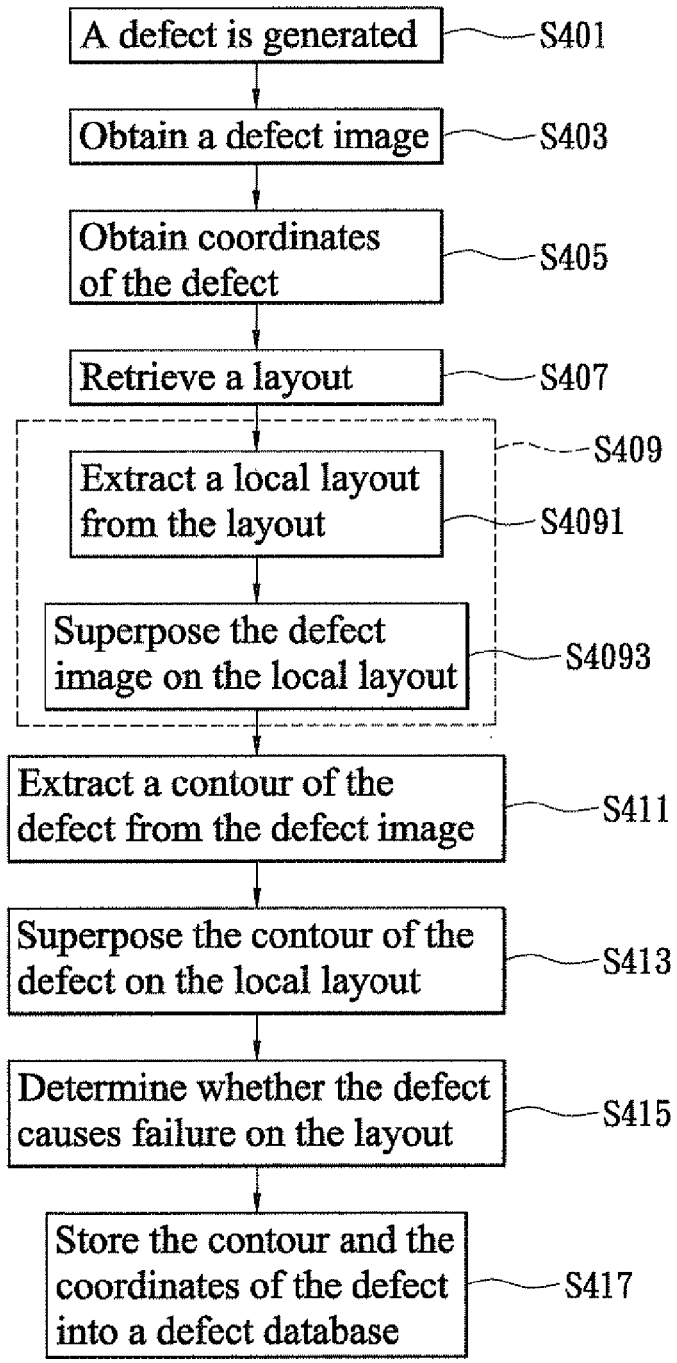
FIG. 11 is a flowchart showing a second preferable embodiment of the method for utilizing fabrication defect of an article according to the present invention.

Please refer to FIG. 11, and associated with FIGS. 2, 3, and 4, the detailed workflow of the second embodiment of the method is set forth as following, which is similar to that of the first embodiment. That is, steps S401 to S407, S411, and S415 to 417 are the same to the steps S101 to S107, S111, and S115 to S117 respectively. Therefore, the following descriptions are focused on steps S409 and S413.

Figure 12:
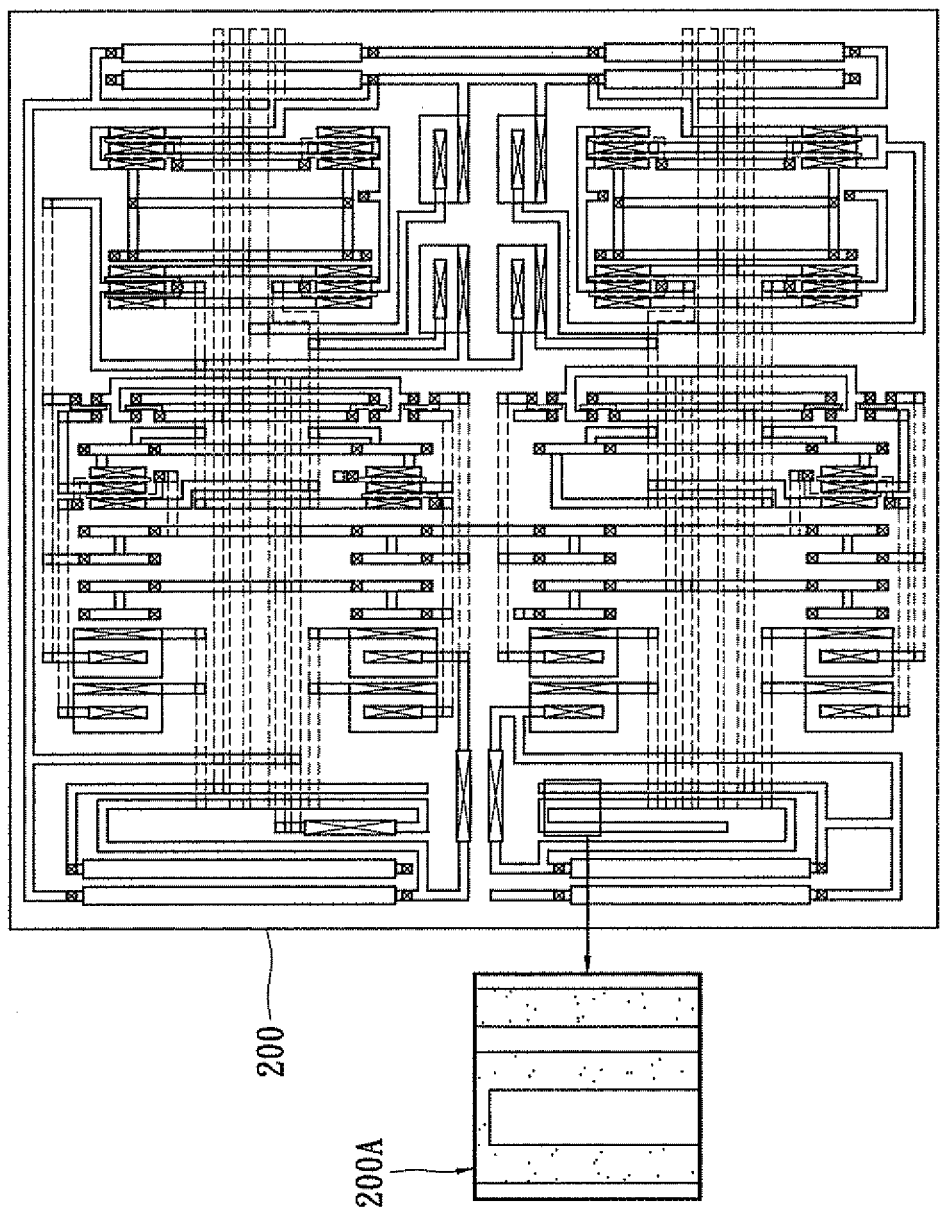
FIG. 12 is a schematic view showing a local layout extracted from the layout according to the present invention.

At step S409, the defect image 100 is also ultimately superposed on the layout 200 according to the coordinates of the defect 101. However it has 3 specific steps. Please refer to FIG. 12, first, a local layout 200A is extracted from the layout 200 around the coordinates of the defect 101 (step S4091). The area of the local layout 200A is much smaller than the layout 200, so the local layout 200A can be operated faster by computer. Next, the defect image 100 is superposed on the local layout 200A, instead of the entire layout 200 (step S4093). Therefore, the following step S311 can be performed faster.

Figure 13:
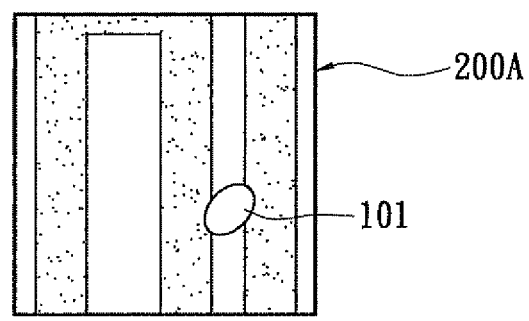
FIG. 13 is a schematic view showing the contour of the defect superposing on the local layout according to the present invention.

Please refer to FIG. 13, at step S413, the contour of the defect 101 is superposed on the local layout 200A. So the final step S415 can be performed faster too, due to the local layout 200A is much smaller than the layout 200.

Like the first embodiment of the method, the second embodiment of the method also has many advanced and alternative steps, such as comprehensive analysis of the defects, combination of DFM, DOE, and prediction of yield of new layout, and combination of the Design of Experiment (DOE), or process split (ex. Defocus Exposure Matrix, etc) with fab module or integration process to find origin and root cause of defect with module or integration process parameters, etc. So these advanced and alternative steps of the second embodiment are not recited again.

In summary, the method according to the invention provides the following effects:

1. The article's health can be monitored during the fabrication process, not until the end of the fabrication process.

2. The determination of failure is based on the actual contour of the defect, so is more accurate. Therefore, the prediction of yield is also more accurate.

3. The new layout's yield is predicted based on the actual random or systematic defects from the fabricated wafer with similar fabrication process. So the prediction is more accurate than conventions.

4. The method is automatically triggered when any new defect image is generated. So the defect image is analyzed in approximate real-time, which ensures no potential failure of the article will be ignored.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A computer-implemented method, made by a computer having a processor and a storage device, for utilizing fabrication defect of an article, executed by the processor, the method comprising steps of:
    obtaining a defect image from a fabrication process for fabricating the article, wherein the defect image comprises a defect and fabricated circuit patterns around the defect;
    obtaining coordinates of the defect;
    retrieving a layout of the article comprising design circuit patterns;
    extracting a contour of the defect from the defect image by cutting defect contour from the defect image file;
    superposing the contour of the defect on the layout according to the coordinates of the defect; and
    determining whether the defect causes an open failure or a short failure on the layout by analyzing overlaps between the contour of the defect and the design circuit patterns, wherein the defect causes the open failure when the contour of the defect intercepts one of the design circuit patterns; the defect causes the short failure when the contour of the defect bridges two of the design circuit patterns.

2. The computer-implemented method according to claim 1, wherein after the step of "retrieving a layout comprising design circuit patterns," the method further comprises a step of: correcting the coordinates of the defect by matching the fabricated circuit patterns of the defect image and the design circuit patterns of the layout.

3. The computer-implemented method according to claim 1, further comprising a step of determining a type of the defect, wherein the type comprises: random particle defect, systematic defect, and process related defect.

4. The computer-implemented method according to claim 3, wherein the systematic defect comprises: necking, bridging, missing, or collapsing.

5. The computer-implemented method according to claim 3, wherein the process related defect comprises: residue, scratch, corrosion, pitting, haze, water mark, peeling, photo resist lifting, or bubble.

6. The computer-implemented method according to claim 1, further comprising a step of: repeating the steps for different defect images from the fabrication process.

7. The computer-implemented method according to claim 6, further comprising steps of:
    obtaining a new layout of a new article, wherein the new layout comprises design circuit patterns;
    superposing the contours of the defects on the new layout according to the coordinates of the defects respectively; and
    determining whether each of the defects causes the open failure or the short failure on the new layout by analyzing overlaps between the contour of each of the defects and the design circuit patterns of the new layout.

8. The computer-implemented method according to claim 7, wherein at the step of "superposing the contours of the defects on the new layout according to the coordinates of the defects respectively" the method further comprises steps of:
    extracting local layouts from the new layout; and
    superposing the contours of defects on the local layouts respectively.

9. The computer-implemented method according to claim 1, further comprises a step of combining a defect diagnosis with Design of Experiment, process split of module, or integration process parameters, wherein the step comprises:
    extracting diagnosis result of the defect;
    extracting the Design of Experiment, process split of module, or integration process parameters;
    performing data analysis between the diagnosis result and the Design of Experiment, process split of module, or integration process parameters; and
    concluding the correlation between defect and the module or integration process parameters, and optimize for minimum defect yield impact.

10. A method for utilizing fabrication defect of an article, made by a computer having a processor and a storage device, comprising steps executed by the processor, of:
    obtaining a defect image from a fabrication process for fabricating the article, wherein the defect image has a defect and fabricated circuit patterns around the defect;
    obtaining coordinates of the defect;
    retrieving a layout of the article comprising design circuit patterns;
    extracting a local layout from the layout around the coordinates of the defect;
    extracting a contour of the defect from the defect image by cutting defect contour from the defect image file;
    superposing the contour of the defect on the local layout; and
    determining whether the defect causes an open failure or a short failure on the layout by analyzing overlaps between the contour of the defect and the design circuit patterns, wherein the defect causes the open failure when the contour of the defect intercepts one of the design circuit patterns; the defect causes the short failure when the contour of the defect bridges two of the design circuit patterns.

11. The method according to claim 10, wherein after the step of "retrieving a layout comprising design circuit patterns," the method further comprises a step of: correcting the coordinates of the defect by matching the fabricated circuit patterns of the defect image and the design circuit patterns of the layout.

12. The method according to claim 10, further comprising a step of: determining a type of the defect, wherein the type comprises: random particle defect, systematic defect, and process related defect.

13. The method according to claim 12, wherein the systematic defect comprises: necking, bridging, missing, or collapsing.

14. The method according to claim 12, wherein the process related defect comprises: residue, scratch, corrosion, pitting, haze, water mark, peeling, photo resist lifting, or bubble.

15. The method according to claim 10, further comprising a step of: repeating the steps for different defect images from the fabrication process.

16. The method according to claim 15, further comprising steps of:
- obtaining a new layout of a new article, wherein the new layout comprises design circuit patterns;
- superposing the contours of the defects on the new layout according to the coordinates of the defects respectively; and
- determining whether each of the defects causes the open failure or the short failure on the new layout by analyzing overlaps between the contour of each of the defects and the design circuit patterns of the new layout.

17. The method according to claim 16, wherein at the step of "superposing the contours of the defects on the layout" the method further comprises steps of:
- extracting local layouts from the new layout around the coordinates of the defects respectively; and
- superposing the contours of defects on the local layouts respectively.

18. The method according to claim 10, further comprises a step of:
- combining a defect diagnosis with Design of Experiment, process split of module, or integration process parameters, wherein the step comprises:
- extracting diagnosis result of the defect;
- extracting the Design of Experiment, process split of module, or integration process parameters;
- performing data analysis between the diagnosis result and the Design of Experiment, process split of module, or integration process parameters; and
- concluding the correlation between defect and the module or integration process parameters, and optimize for minimum defect yield impact.

\* \* \* \* \*